Oct. 5, 1937.   W. DE BACK   2,094,874

PROCESS OF BLANCHING SPINACH AND THE LIKE

Filed Nov. 13, 1934

INVENTOR.
William de Back.
BY Philip A. Minnis
ATTORNEY.

Patented Oct. 5, 1937

2,094,874

UNITED STATES PATENT OFFICE 2,094,874

PROCESS OF BLANCHING SPINACH AND THE LIKE

William de Back, San Jose, Calif., assignor to Food Machinery Corporation, San Jose, Calif., a corporation of Delaware Application November 13, 1934, Serial No. 752,827

3 Claims. (Cl. 99—103)

This invention relates to the preparation of leafy vegetables, more especially spinach, preliminary to canning, and is particularly concerned with an improved method of blanching or wilting the same.

The principal objective of the invention is to provide an improved blanching process, applicable to spinach or similar vegetables of a leafy chlorophyll containing nature, which is rapid, effective, and economical in operation, and which does not injuriously affect the natural color, flavor, or uniformity of texture and appearance of the product.

The commercial canning of spinach requires that it be blanched or wilted prior to its introduction into cans in order to drive out the occluded air or gases which may be present in the tissues and stems and reduce its bulk sufficiently so that a reasonable quantity can be introduced into each can. This has been accomplished in the past by various methods, the most common being to immerse the spinach in hot water for the requisite period of time, although blanching has also been effected by other methods such as by discharging the hot water onto the spinach in the form of low pressure jets or streams, and also by steam treatment.

The principal difficulty met with in the practice of the first two methods referred to resides in the problem of economically effecting the blanching without objectionable loss of color and flavor. Spinach contains certain organic acids which are liberated into the hot blanch water and, thereupon, react with the chlorophyll so as to destroy or partially destroy it, and thereby impart a dull brownish color to the spinach, making it unattractive and unappetizing in appearance. Consequently, unless the blanch water is continuously changed, the liberated acids accumulate in ever increasing concentration, thereby resulting in correspondingly greater destruction of the chlorophyll and impairment of the natural color of the spinach.

On the other hand, continuous changing of the large volumes of blanch water required in these methods is not only very costly, because of the waste of water and the excessive steam consumption required for heating a continuous supply of fresh water, but much of the spinach flavor is lost because of the dissolution of nutritive solids therefrom, which are carried away by the blanch water.

In addition to these difficulties, a further unsatisfactory feature encountered when the blanch water is applied in the form of solid jets resides in the difficulty of securing uniform application of the blanch water to all portions of the spinach, which is necessary to secure uniformity in texture of the blanched product.

Blanching by steam treatment has also proved unsatisfactory in practice, chiefly for a similar reason to that just referred to above, namely, the difficulty in providing uniform application of the steam to all parts of the spinach so that uniformity of blanching is prevented.

I have found that spinach may be blanched effectively and economically without the difficulties heretofore encountered by applying the hot blanching liquid to it in finely divided form such as may be produced by spray nozzles, to which the blanch water is supplied under sufficiently high pressure to break it up or atomize it into finely divided form and jet it against the spinach. For example, satisfactory results have been obtained in practice by using spray nozzles having a capacity of substantially a gallon per minute at a pressure of 250 lbs. per square inch, and supplying the blanch water to them under pressures ranging from 250 to 350 lbs. per square inch. In this manner jets of finely divided or atomized spray may be produced which resolve into what might be termed a fog-like mist. The temperature of the blanch water may be from 180° F. to 200° F., according to the characteristics and requirements of the vegetable being treated.

It may be stated that the invention is not necessarily strictly limited to the employment of the particular range of pressures specified, which, although preferable as giving best results in practice, may be departed from to a certain extent with more or less satisfactory results. It should be understood, however, that in any event the pressure must not be lower than that required to break the liquid up into sufficiently finely divided form as not to damage the product, since the application of too coarse a spray, or of solid jets under any considerable pressure, is not only apt to tear and lacerate the product but will not provide the uniform application required for best results. Higher pressures than those specified may, of course, be used, but have been found to be unnecessary because they do not produce proportionately better results and, moreover, too fine a division of the liquid may prove uneconomical because as the fineness of the particles is increased their ability to retain heat is at the same time decreased.

It will be observed that by the application of the blanch water in finely divided form, as described, a relatively small amount of water may be spread effectively and uniformly over a considerable area. Consequently, the water requirements, as well as the heat requirements, are very small as compared with prior methods, while at the same time the uniformity of application assures a final product of uniform color and texture. Moreover, it has been found that the jets impinging upon the product have a beating effect which, although not severe enough to injure it, because of the fineness of the particles, does augment to a certain extent the action of the heat in driving occluded air and gases from the tissues and stems, and thereby accelerates the blanching action.

Important benefits as regards color and flavor of the spinach are also obtained. The economy effected in water and heat requirements makes it possible to provide a continuous application of fresh blanch water at no great expense and to discard the used blanch water as it drains away from the spinach, so that such acids as may be liberated into the water do not accumulate to the detriment of the chlorophyll, but are continuously carried away and disposed of. Furthermore, since the water is not applied in sufficient quantities to immerse the spinach or have any appreciable flushing action thereon, only a negligible, if any, percentage of nutritive solids are dissolved and carried away, so that the full flavor is substantially unimpaired.

Preferably, in carrying out my process, the spinach to be blanched is passed in a continuous stream through the zone of treatment wherein it is subjected to the action of one or more jets of the atomized blanch water, the spinach being thoroughly agitated meanwhile to expose all portions of its surfaces to the action of the jets. As illustrative of a practical application of the process, reference may be had to the accompanying drawing, wherein is illustrated a suitable form of apparatus which may be employed to advantage for the purpose.

Figure 1:
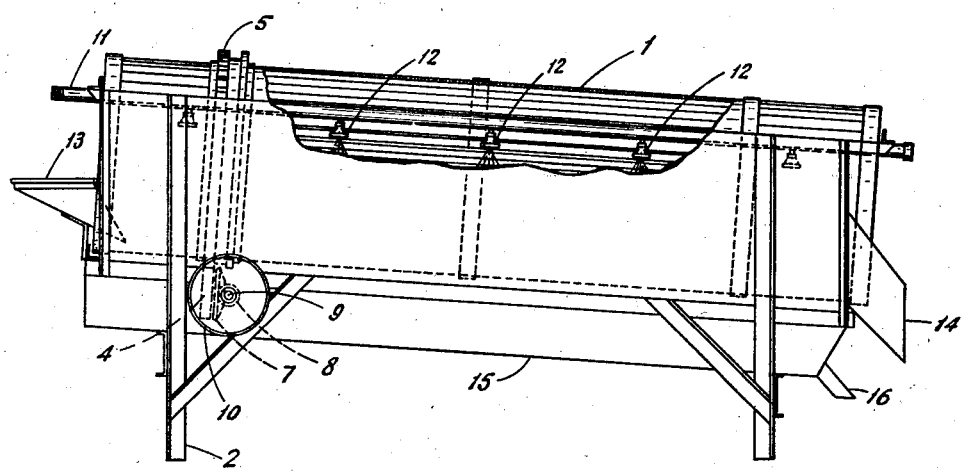
Figure 1 is a side elevation of the apparatus with certain portions broken away to illustrate a portion of its interior.
Figure 2:
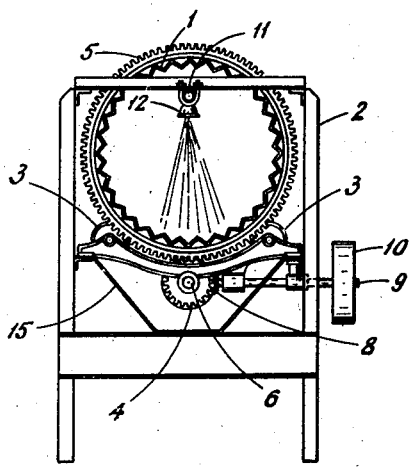
Figure 2 is an end elevation of the apparatus shown in Figure 1 as viewed from the left thereof.

The machine illustrated includes a perforated cylindrical drum 1 open at both ends and having a longitudinally corrugated inner surface. The drum is rotatably supported in inclined position in a framework 2 upon rollers 3, and may be driven by a pinion 4 intermeshing with a ring gear 5 encircling the drum. The pinion 4 is secured to a shaft 6 which also carries a bevel gear 7 intermeshing with a bevel pinion 8 carried by a shaft 9 having a pulley 10 on its outer end to which power may be supplied from any suitable source.

Extending longitudinally through the drum in the upper portion thereof is a pipe 11 to which are connected a series of nozzles 12 disposed to discharge downwardly towards the bottom of the drum. The pipe 11 may be connected to any suitable source of liquid supply capable of supplying liquid under a pressure of from 250 to 350 lbs. per square inch, and the nozzles 12 are designed to receive the liquid at such pressures and discharge the same in finely divided or atomized form. Preferably each nozzle may have a capacity of approximately a gallon per minute at a pressure of 250 lbs. per square inch.

In operation, power may be supplied to the pulley 10 to rotate the drum 1 continuously, and the spinach to be blanched may be introduced into the interior of the drum by way of the feed hopper 13. Upon being deposited into the drum, the spinach is continuously rolled over and over by the action of the corrugated interior surface of the drum, and simultaneously slowly advanced towards the lower end of the drum, due to its inclination, where it is finally discharged through the discharge chute 14.

During the passage of the spinach through the drum, as will be apparent, it is subjected to action of the hot blanch water discharged from the spray nozzles 12 in the form of jets of atomized spray, which impinge upon the spinach with more or less force, so that by the time the spinach has passed through the drum the blanching has been completed through the combined heating action of the jets and their beating action on the spinach.

A drip pan 15 extends beneath the drum to receive the used blanch water as it drains from the spinach and discharge it to a suitable point of disposal through the spout 16.

It is believed that the operation and advantages of my improved method of blanching will now be apparent, but it will be understood that while I have described the same as specifically applied to the blanching of spinach, it may also be applied to other vegetables of a similar leafy chlorophyll containing nature, and the term "spinach" as used herein is intended to be inclusive of such other vegetables.

Having now described my invention and in what manner the same may be used, what I claim as new and desire to protect by Letters Patent is:

1. In the treatment of spinach or the like for canning, the step of blanching the spinach by subjecting it to the action of heated liquid discharged under pressure thereagainst in the form of jets of finely divided mist-like spray.

2. A method of blanching spinach or the like comprising the steps of atomizing a heated liquid to produce a finely divided fog-like mist thereof, and subjecting the spinach to contact therewith.

3. In the treatment of spinach or the like for canning, the step of subjecting the spinach to a jet of hot liquid spray of such finely divided form as may be produced by a spray nozzle having a capacity of approximately a gallon of liquid per minute at 250 lbs. per square inch to which the liquid is supplied at a pressure in excess of 250 lbs. per square inch.

WILLIAM DE BACK.